United States Patent Office 2,830,053
Patented Apr. 8, 1958

2,830,053
6-SUBSTITUTED PURINE COMPOUNDS AND METHOD OF MAKING

George H. Hitchings, Tuckahoe, and Gertrude B. Elion, Bronxville, N. Y., assignors to Burroughs Wellcome & Co. (U. S. A.) Inc., Tuckahoe, N. Y., a corporation of New York No Drawing. Application July 18, 1955
Serial No. 522,815

Claims priority, application Great Britain March 25, 1955

4 Claims. (Cl. 260—254)

The present invention relates to novel 6-substituted purine compounds and to the method of preparing them.

The preparation of 6-chloropurine and the utility of this compound as an intermediate in the synthesis of various 6-mercaptopurines and related compounds is described in the copending application of Hitchings and Elion, Serial No. 367,772, now U. S. Patent No. 2,746,961. Although 6-chloropurine reacts quite rapidly with certain types of anions, including thiocyano and thiophenyl, it does not readily combine with the cyanide ion which is a precursor for many products of therapeutic value. These compounds include purine acid amides, esters, ketones, and a large number of related derivatives. The present invention relates to compounds of the formula:

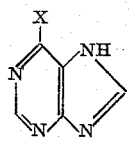

wherein X is selected from the class consisting of bromine and iodine. Compounds of this class include 6-bromopurine and 6-iodopurine which are found to combine readily with the cyanide ion to form 6-cyanopurine. Moreover, these compounds constitute an important alternative route in the formulation of 6-mercaptopurine and related derivatives, the utility of which is well known in leukemia therapy.

The 6-iodopurine may be readily prepared through the reaction of 6-chloropurine with hydriodic acid. 6-bromopurine may be conveniently prepared, for example, by the reaction of hypoxanthine with phosphorus oxybromide. Alternatively, it may also be prepared from 6-chloropurine and hydrogen bromide preferably in saturated acetic acid solution.

6-bromopurine

A mixture of 5 g. hypoxanthine and 50 g. of phosphorus oxybromide was heated at 130° for 7 hours in a flask with an air condenser equipped with a drying tube. The mixture was cooled and extracted five times with 100 ml. portions of benzene. The solid residue was treated with 60 g. of cracked ice to decompose any remaining phosphorus oxybromide and the mixture filtered after about 10 minutes. The wet filter cake was treated with 100 ml. of acetone and the insoluble residue filtered off. The acetone filtrate was neutralized with concentrated ammonium hydroxide and then evaporated at room temperature to 30 ml. The precipitate of 6-bromopurine (4.1 g.) was collected, washed with a small amount of cold water and dried at room temperature. It was recrystallized from 50 parts of hot water, using Darco, and the colorless crystals showed an ultraviolet absorption spectrum with $\lambda$ max.=265 m$\mu$ at pH 1 and $\lambda$ max.=275 m$\mu$ at pH 11.

6-mercaptopurine 1 g. of 6-bromopurine was dissolved in 20 ml. of N sodium hydrosulfide solution and warmed in a sealed tube in the steam bath for 60 minutes. The solution was cooled and acidified with hydrochloric acid (to pH 4) to cause precipitation of the 6-mercaptopurine. The product was recrystallized by solution in 100 ml. of 0.05 N sodium hydroxide, filtration and acidification. The yield was nearly quantitative.

6-iodopurine

To 50 ml. of concentrated hydriodic acid (sp. g. 1.70) at 0° was added slowly 5.9 g. of powdered 6-chloropurine. The mixture was allowed to stand at 0° for one and one-half hours, and the solid material collected on a sintered glass funnel. The solid was dissolved in 100 ml. of water by the addition of ammonium hydroxide to pH 8, and the 6-iodopurine hemihydrate (5.5 g.) was precipitated by acidification to pH 5 with acetic acid. The 6-iodopurine hemihydrate melts at 167° dec.

6-mercaptopurine may be prepared from 6-iodopurine by the reaction of alkali hydrosulfide similarly as above.

What we claim is:
1. Compounds of the formula:

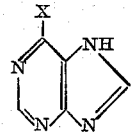

wherein X is selected from the class consisting of bromine and iodine.
2. A 6-bromopurine.
3. A 6-iodopurine.
4. The method of preparing 6-iodopurine which comprises reacting 6-chloropurine with hydriodic acid.

References Cited in the file of this patent

Mason: J. Chem. Soc. (London), 1954, 2071–81.
Wagner and Zook: Synthetic Org. Chem. (1953), p. 591, call No. QD262W24C.2, John Wiley and Sons, New York, N. Y.
Houben: Die Methoden der Organischen Chemie, Dritte Auflage (1943), vol. 3, page 1194, call No. QD258.H7."